United States Patent [19]

Yusa et al.

[11] Patent Number: 4,607,080

[45] Date of Patent: Aug. 19, 1986

[54] THERMOPLASTIC RESIN COMPOSITION

[75] Inventors: Haruhiko Yusa; Masanori Oota; Kazuo Takahashi, all of Iwaki, Japan

[73] Assignee: Kureha Kagaku Kogyo Kabushiki Kaisha, Tokyo, Japan

[21] Appl. No.: 821,878

[22] Filed: Jan. 27, 1986

Related U.S. Application Data

[63] Continuation of Ser. No. 764,058, Aug. 9, 1985, abandoned, which is a continuation of Ser. No. 710,090, Mar. 11, 1985, abandoned.

[30] Foreign Application Priority Data

Mar. 15, 1984 [JP] Japan ................................. 59-48061

[51] Int. Cl.[4] ...................... C08L 33/08; C08L 51/04
[52] U.S. Cl. ...................................... 525/82; 525/80; 525/84
[58] Field of Search ............................. 525/80, 82, 84

[56] References Cited

U.S. PATENT DOCUMENTS 4,085,166  4/1978  DiLeone et al. .
4,362,845  12/1982  Kamata et al. .

Primary Examiner—Jacob Ziegler
Attorney, Agent, or Firm—Wegner & Bretschneider

[57] ABSTRACT

An impact-resistant thermoplastic resin composition having excellent transparency and appearance properties which comprises (A) a butadiene-styrenemethyl methacrylate-alkyl acrylate graft copolymer obtained by postpolymerization of styrene, methyl methacrylate and an alkyl acrylate to a latex comprising a butadiene homopolymer rubber or a butadiene-styrene copolymer rubber comprising mainly butadiene and having an average particle diameter of 0.1 to 0.5 $\mu$, and (B) a methyl methacrylate-styrene copolymer. This composition has quantitative limitation.

2 Claims, No Drawings

THERMOPLASTIC RESIN COMPOSITION

This application is a continuation application of U.S. application Ser. No. 764,058, filed Aug. 9, 1985, now abandoned, which is a continuation of Ser. No. 710,090, filed Mar. 11, 1985, now abandoned.

BACKGROUND OF THE INVENTION

The present invention relates to an impact-resistant thermoplastic resin composition. More specifically, it relates to an impact-resistant thermoplastic resin composition having excellent processability, transparency and appearance properties. This resin composition is prepared by mixing a butadiene-styrene-methyl methacrylate-alkyl acrylate graft copolymer (hereinafter referred to as an MBAS resin) with a methyl methacrylate-styrene copolymer (hereinafter referred to as an MS resin), the MBAS resin being prepared by post-polymerizing styrene, a methacrylate, an acrylic acid alkyl ester having 2 to 8 carbon atoms in the alkyl group and, if necessary, a crosslinkable monomer copolymerizable with these monomers with a latex of polybutadiene or a butadiene-styrene copolymer comprising mainly butadiene.

There has heretofore been known a thermoplastic resin composition having satisfactory transparency and excellent impact resistance which comprises the MS resin blended with an MBS copolymer or ABSM copolymer (acrylo-nitrile-butadiene-styrene-methyl methacrylate copolymer) which is obtained by graft polymerizing a monomer selected from the group consisting of styrene, methyl methacrylate and acrylonitrile with a butadiene-styrene copolymer (e.g., as disclosed in Japanese Examined Patent Publication No.52-32772). In fact, these thermoplastic resin compositions are transparent and have high impact resistance. However, the appearance properties of these resin compositions are not always satisfactory. A methyl methacrylate resin or a methyl methacrylate-styrene resin is essentially characterized by high transparency and the flaw-free surface and high surface gloss of a shaped article derived therefrom. Because of these characteristics, these resins are advantageously used in various applications. However, in order to overcome the inadequacy, i.e., low impact resistance, of these resins, the MBS or ABSM resin is blended with these resins. This blending is certainly effective for remarkably improving the impact resistance without degrading the transparency. The resultant resin composition may however suffer from the development of non-melted matters called fish eyes. Especially an extrudate derived from such a composition is liable to have unevenness on the surface thereof which impairs the appearance properties. Therefore, such a resin composition may be extremely restricted in its use.

SUMMARY OF THE INVENTION

As a result of extensive studies on these inadequacies, we have found that when the conventional MBAS resin comprising a butadiene or butadiene-styrene rubber latex with which styrene, methyl methacrylate or acrylonitrile is graft polymerized is modified by replacing part of the methyl methacrylate with an acrylic acid alkyl ester, the resultant modified MBAS is capable of imparting a high transparency and impact resistance to the MS resin and simultaneously of providing satisfactory appearance properties. Thus we have arrived at this invention.

The present invention relates to an impact-resistant thermoplastic resin composition having excellent transparency and appearance properties which comprises (A) 1 to 50 parts of a butadiene-styrene-methyl methacrylate-alkyl acrylate graft copolymer obtained by postpolymerizing styrene, methyl methacrylate and an alkyl acrylate and, if necessary, a crosslinking monomer copolymerizable with these monomers to a latex comprising 40 to 80 parts of a butadiene polymer rubber or a butadiene-styrene copolymer rubber comprising mainly butadiene and having an average particle diameter of 0.1 to 0.5$\mu$, the amount of the styrene, methyl methacrylate and alkyl acrylate monomers being such as to provide 100 parts in complementary relationship with the rubber content in the latex, the mutual proportion of these monomers being 20 to 65% of styrene, 20 to 70% of methyl methacrylate and 1 to 35% of alkyl acrylate, and (B) 50 to 99 parts of a methyl methacrylate-styrene copolymer having a composition of 40 to 80% of methyl methacrylate and 20 to 60% of styrene, wherein the total amount of the composition is 100 parts. Throughout this specification, quantities expressed in "percent" and "parts" are by weight.

In the case where the grafting components to be graft polymerized to the rubber polymer are only styrene and methyl methacrylate, it is sometimes difficult to attain excellent appearance properties. In accordance with the present invention, by blending a graft copolymer, obtained by using a grafting component comprising 1 to 35% of an alkyl acrylate, in addition to styrene and methyl methacrylate, with the MS resin, an excellent thermoplastic resin composition having a well-balanced combination of impact resistance, transparency and appearance properties, which could not have been realized hitherto and which exhibits remarkably improved appearance properties even when being shaped into an extruded article, can be obtained.

DETAILED DESCRIPTION OF THE INVENTION

The resin composition of the present invention comprises an MBAS resin and an MS resin.

MBAS Resin

The term "MBAS resin" as used herein designates, as described hereinabove, a butadiene-styrene-methyl methacrylate-alkyl acrylate graft copolymer obtained by postpolymerizing styrene, methyl methacrylate and an alkyl acrylate and, as an optional monomer, a crosslinking monomer in a latex of polybutadiene rubber or a butadiene-styrene copolymer rubber comprising mainly butadiene. It is not always clear whether or not all the monomers are graft copylymerized to the rubber polymer by the postpolymerization. Moreover, there is not much practical profit in clarifying this point. Therefore, in the present invention, a copolymer produced from the postpolymerization of the above-mentioned monomers in the abovementioned rubber latex is referred to as "graft copolymer" for convenience.

The rubber latex to be a "trunk" polymer of the graft copolymer in this sense is one in which the rubber is a butadiene polymer or a butadiene-styrene copolymer comprising mainly butadiene. The term "polymer" as used herein does not necessarily refer to a "homopolymer". Also, the term "copolymer" as used herein is not limited to one composed only of the monomers referred to. When a polymer (a) of a specific monomer or a copolymer (b) of specific monomers is referred to herein, it will be apparent that these terms include copolymers (a' and b') with a small amount of monomers copolymerizable with the particular monomers described for the polymer (a) and copolymers (b), respectively, provided that the physicochemical properties of the copolymers (a') and (b') as a polymeric material are not essentially different from those of the polymer (a) or (b).

The rubber latex of the butadiene polymer or the butadiene-styrene copolymer comprising mainly butadiene can be prepared by a known emulsion polymerization method. In this case, crosslinking agents, e.g., divinylbenzene, dimethacrylates such as ethyleneglycol dimethacrylate and trimethyleneglycol dimethacrylate, and diacrylates such as ethyleneglycol diacrylate and 1,3-butanediol diacrylate, can be used to crosslink the rubber copolymer. Chain transfer agents, e.g., dodecyl mercaptan and lauryl mercaptan, can also be used to control the gel content of the rubber polymer obtained. The rubber polymer latex thus obtained preferably has a solid content of 20 to 50%, particularly 25 to 45. The impact modifying effect of the MBAS on the MS resin is influenced by the particle diameter of the rubber latex used therein, and it is necessary to adjust the particle diameter to 0.1 to 0.5μ in terms of an average particle diameter. The particle diameter can be adjusted by the choice of the type of the emulsifier used and the amount of the catalyst used when the emulsion polymerization is carried out. Alternatively, a rubber latex having an average particle diameter of 0.05 to 0.1μ can be preliminarily prepared and mixed with a coagulating agent so as to coagulate the latex partly thereby to adjust the average particle diameter to 0.1 to 0.5μ. For the coagulating agent, conventional electrolyte materials, e.g., inorganic acids such as hydrochloric acid, sulfuric acid and nitric acid; organic acids such as acetic acid, malic acid and maleic acid; and salts such as sodium chloride, calcium chloride and magnesium chloride are used.

The thus obtained latex comprising 40 to 80 parts of the rubber polymer having an average particle diameter of 0.1 to 0.5μ is mixed with 20 to 60 parts of a monomer mixture of styrene, methyl methacrylate and an alkyl acrylate and, if necessary, 0.01 to 5% of a crosslinking monomer copolymerizable with these monomers in such a manner that the amount of the monomers is a complementary amount such as to provide 100 parts in combination with the amount of the rubber polymer. Then, the resultant mixture is subjected to graft polymerization. The proportions of styrene, methyl methacrylate and the alkyl acrylate added to the rubber polymer latex are important for obtaining a uniform compatibility of the MBAS resin with the MS resin and for obtaining a resin composition having excellent transparency and appearance properties and exhibiting high impact resistance. It is necessary that the the proportions of styrene, methyl methacrylate and the alkyl acrylate be such that the styrene is 20 to 65%, preferably 25 to 55 %, the methyl methacrylate is 20 to 70%, preferably 30 to 65%, and the alkyl acrylate is 1 to 35%, preferably 5 to 30%. A small amount of comonomers copolymerizable with these three monomers may further be included so long as the above-mentioned proportions are used. It is apparent from the foregoing description of the rubber component that these grafting components according to the present invention should be understood in this manner.

For the alkyl acrylate, alkyl acrylates having 2 to 8 carbon atoms in the alkyl group, e.g., ethyl acrylate, butyl acrylate, octyl acrylate and 2-ethylhexyl acrylate are used. The proportion of the alkyl acrylate to the total amount of the monomers added is in the range of from 1 to 35%, preferably 5 to 25%. If the amount of the alkyl acrylate is less than 1%, the advantage due to its use is not observed, i.e., dispersion of the MBAS in the MS is poor causing occurrence of fish eyes. On the other hand, if the amount of the alkyl acrylate is more than 35%, the resultant thermoplastic resin composition exhibits a reduced heat resistance.

The monomer components to be postpolymerized to the rubber polymer may be added at one time. The monomer components can also be added dividedly into batches several times, or they can also be continuously added. The monomer mixture to be postpolymerized may contain, if necessary, 0.01 to 5 parts, based on 100 parts of the total amount of the rubber and the monomer mixture, of a crosslinking monomer copolymerizable with the monomers. The crosslinking monomer is effective for improving the melt fluidity of the resultant thermoplastic resin composition. As the crosslinking agent, use is made of the above-mentioned crosslinking monomers (having a plurality of ethylenical unsaturation) used for crosslinking the rubber polymer.

MS Resin

The resin component to be blended with the MBAS resin obtained as described above is an MS resin, i.e., a methyl methacrylate-styrene copolymer. It is apparent from the description of the MBAS resin that the term "methyl methacrylate-styrene copolymer" as used herein may include, in addition to a copolymer composed only of the monomers referred to, i.e., methyl methacrylate and styrene, copolymers comprising these monomers and a small amount (below 10%) of comonomers (e.g. diene compound) copolymerizable with these monomers. The MS resin may be prepared by a known emulsion polymerization method, suspension polymerization method or bulk polymerization method.

The proportions of the methyl methacrylate and the styrene are such that the methyl methacrylate is in the range of from 40 to 80%, preferably 45 to 75%, and the styrene is in the range of from 20 to 60%, preferably 25 to 55%. As described hereinabove, the MS resins include those in which 50% or less of the methyl methacrylate is replaced with other methacrylates such as ethyl methacrylate and butyl methacrylate and/or acrylonitrile, and/or 50% or less of the styrene is replaced with other aromatic vinyl monomers such as α-methylstyrene, vinylnaphthalene and isopropenylnaphthalene.

Preparation of Composition

The mixing proportion of the MBAS resin is 1 to 50 parts, preferably 5 to 30 parts, and that of the MS resin is 50 to 99 parts, preferably 70 to 95 parts, for the purpose of attaining improved impact resistance. (A composition comprising the MBAS resin and the MS resin is taken to be 100 parts.)

The preparation of the composition according to the present invention can be carried out by any method capable of ensuring the formation of a uniform and tight blend of the MBAS resin and the MS resin.

A preferable method will comprise a step of mixing the resins and a step of melting the mixture. The mixing of the resins can be carried out when both resins are in an emulsion form. If it is taken into consideration that melt kneading usually takes place when a shaped article is fabricated from the composition by injection molding or like process, and if uniform mixing is ensured, it is needless to say that the composition of the present invention be prepared by a mere mixing process involving no melting step.

The composition of the present invention is essentially a thermoplastic resin composition. Accordingly, the composition of the present invention may contain auxiliary materials conventionally used for such a composition as long as they are compatible with the composition of the present invention. Included among such auxiliary materials are thermoplastic resins, antioxidants, thermal stabilizers, coloring matters, fillers and other additives.

In order to indicate more fully the nature and utility of this invention, the following specific examples thereof are set forth hereunder. In these examples, quantities expressed in "parts" and "%" are by weight.

EXAMPLE 1

An autoclave provided with a stirrer was charged with 46 parts of butadiene, 19 parts of styrene, 150 parts of water, 0.5 part of potassium oleate, as an emulsifier, 0.13 part of t-butyl hydroperoxide, as an initiator, 0.03 part of Rongalit, 0.002 part of ferrous sulfate, 0.003 part of sodium ethylenediaminetetraacetate and 0.1 part of sodium pyrophosphate. The resulting mixture was polymerized at a temperature of 45° C. for 17 hours. The resultant rubber latex had an average particle diameter of 0.08μ. 0.059 part of sodium sulfosuccinate was added to the latex to stabilize the same.

An aqueous 0.2% HCl solution and an aqueous 2% sodium hydroxide solution were added to the latex from separate nozzles to maintain the pH of the latex at a value of 8.0 to 9.0, thereby partly coagulating the latex to enlarge the particles of the latex. The thus obtained latex had an average particle diameter of 0.19μ. To this rubber latex, the following monomer mixture was added together with polymerization aids. The resultant mixture was reacted at a temperature of 60° C. for 6 hours. The polymerization conversion was 99%.

| Composition | Part | % |
|---|---|---|
| Styrene | 12 | 34.3 |
| Methyl methacrylate | 16 | 45.7 |
| Ethyl acrylate | 7 | 20.0 |
| Divinylbenzene | 0.04 | |
| t-butyl hydroperoxide | 0.08 | |
| Rongalit | 0.08 | |

0.5 part of t-butyl phenol and 0.5 part of dilauryl thiopropionate were added to the resultant latex.

Thereafter, the latex was subjected to aciding-out, dehydrated, washed with water and dried to obtain an MBAS resin in the form of powder. 20 parts of the resultant MBAS resin was mixed with 80 parts of pellets of an MS resin (a copolymer of 60% of methyl methacrylate and 40% of styrene, refractive index $n_D^{23}$: 1.5372, melt viscosity determined at 230° C.: $1.0 \times 10^3$ poise). The mixture was kneaded in an extruder having a 50 mm diameter at a temperature of 230° C. to obtain pellets of the mixed resin. The pellets were shaped into a 0.2 mm T-die sheet by means of the same extruder and a 3 mm strip by means of an injection molding machine.

The physical properties of these sheet and strip were determined, whereupon the results shown in Table 1 were obtained. The resultant shaped articles had excellent transparency, contained little non-melted matters (fish eye), and had excellent surface gloss. The Izod impact strength of the strip was 5.0 kg·cm/cm, which was about 4 times that, i.e., 1.2 kg·cm/cm, of the MS resin alone.

TABLE 1

| Physical properties of T-die sheet | | Physical properties of injection-molded article | |
|---|---|---|---|
| Transparency *1 (Tp %) | State of fish eyes *2 (rank) | Izod strength *3 (kg · cm/cm) | Vicat softening temperature *4 (°C.) |
| 94 | A | 5.0 | 99 |

*1 ASTM-D-1003, Tp: parallel light transmittance.
*2 The T-die sheet was observed and graded A, B, C, D, or E. The symbol A indicates almost no presence of fish eyes, and the symbol E indicates the presence of countless fish eyes on the entire surface. In this manner, the degree of occurrence of fish eyes was divided into five ranks.
*3 ASTM-D-256, U notch (R = 1.0 mm).
*4 ASTM-D-1525, load 5 kg.

EXAMPLES 2, 3, 4, 10, 11 AND 12

MBAS resins were prepared as in Example 1 except that the proportions of the monomers postpolymerized with the rubber latex were changed as shown in Table 2. The resultant MBAS resins were kneaded with the MS resin in the same manner as in Example 1. The physical properties of the resultant shaped articles are shown in Table 2. It was found that replacing a part of the methyl methacrylate with a monomer selected from ethyl acrylate (EA), butyl acrylate (BA) and 2-ethylhexyl acrylate (2-EHA), the occurrence of fish eyes could be reduced to an extreme degree without deterioration of the other physical properties of the shaped articles. The shaped articles exhibited excellent appearance properties.

EXAMPLES 5, 6, 7, 8 AND 9

MBAS resins were prepared as in Example 3 except that the grafting monomers were added with the monomer composition in the following table in two stages, and each polymerization stage was carried out at a temperature of 60° C. for 6 hours. The physical properties of blends of the MBAS resins with the MS resin, which were obtained in the same manner as in Example 1, are shown in Table 2.

| Example No. | First stage monomer composition (part) | | | | Second stage monomer composition (part) | | | |
|---|---|---|---|---|---|---|---|---|
| | ST | MMA | EA | DVB | ST | MMA | EA | DVB |
| 5 | 6.0 | 9.0 | 2.5 | 0.02 | 6.0 | 9.0 | 2.5 | 0.02 |
| 6 | 12.0 | 8.0 | 0 | 0.02 | 0 | 10.0 | 5.0 | 0.02 |
| 7 | 0 | 10.0 | 5.0 | 0.02 | 12.0 | 8.0 | 0 | 0.02 |
| 8 | 12.0 | 0 | 0 | 0.01 | 0 | 18.0 | 5.0 | 0.03 |
| 9 | 0 | 18.0 | 5.0 | 0.03 | 12.0 | 0 | 0 | 0.01 |

EXAMPLE 13

An MBAS resin was prepared as in Example 3 except that the monomer mixture was continuously added to the rubber latex over a period of 7 hours and was reacted at a temperature of 60° C. The physical properties of the shaped article obtained in the same manner as in Example 1 are shown in Table 2.

EXAMPLES 14 AND 15, AND COMPARATIVE EXAMPLE 3

MBAS resins were prepared as in Example 3 except that the average particle diameter of the rubber latex was modified to 0.25μ (Example 14) and 0.5μ (Example 15) by using different coagulating conditions, and in Comparative Example 3, the coagulating process was not carried out, i.e., the average particle diameter of the rubber latex was 0.08μ. The impact strength of the resin composition of Comparative Example 3 is inferior to those of the resin compositions of Examples 14 and 15.

COMPARATIVE EXAMPLES 1 AND 2

MBAS resins were prepared as in Example 1 except that the grafting monomers contained no acrylic acid ester (Comparative Example 1) or contained an excessive amount of an acrylic acid ester (Comparative Example 2). It is evident that in Comparative Example 1, a large amount of fish eyes were formed and in Comparative Example 2, the thermal deformation temperature decreased.

TABLE 2
Composition of Grafting Monomers for MBAS Resin and Physical Properties of Shaped Article

| | St | | MMA | | AE | | DVB | Physical properties of T-die sheet | | Physical properties of injection-molded article | |
|---|---|---|---|---|---|---|---|---|---|---|---|
| | | | | | | | | Transparency (Tp %) | State of fish eyes (rank) | Izod strength (kg · cm/cm) | Vicat softening temp. (°C.) |
| | Part | % | Part | % | Part | % | Part | | | | |
| Exam. No. | | | | | | | | | | | |
| 2 | 12.0 | 34.3 | 20.5 | 58.6 | 2.5(EA) | 7.1 | 0.04 | 94 | B | 5.0 | 99 |
| 3 | " | " | 18.0 | 51.4 | 5.0(EA) | 14.3 | " | 94 | A | 5.0 | 99 |
| 4 | " | " | 13.0 | 37.1 | 10.0(EA) | 28.6 | " | 94 | A | 5.3 | 97 |
| 5 | " | " | 18.0 | 51.4 | 5.0(EA) | 14.3 | " | 94 | A | 5.0 | 99 |
| 6 | " | " | " | " | " | " | " | 94 | A | 5.0 | 99 |
| 7 | " | " | " | " | " | " | " | 94 | A | 5.0 | 99 |
| 8 | " | " | " | " | " | " | " | 93 | A | 5.2 | 99 |
| 9 | " | " | " | " | " | " | " | 93 | A | 5.2 | 99 |
| 10 | " | " | " | " | " | " | 0 | 94 | A | 6.5 | 97 |
| 11 | " | " | " | " | 5.0(BA) | " | 0.04 | 94 | A | 5.0 | 99 |
| 12 | " | " | " | " | 5.0(2EHA) | " | " | 93 | A | 4.9 | 98 |
| 13 | " | " | " | " | 5.0(EA) | " | " | 94 | A | 5.0 | 99 |
| 14 | " | " | " | " | " | " | " | 94 | A | 5.5 | 99 |
| 15 | " | " | " | " | " | " | " | 91 | B | 8.9 | 99 |
| Comp. Ex. No. | | | | | | | | | | | |
| 1 | " | " | 23.0 | 65.7 | 0 | 0 | 0.04 | 90 | E | 5.2 | 100 |
| 2 | " | " | 8.0 | 22.8 | 15.0(EA) | 42.9 | " | 93 | A | 5.8 | 89 |
| 3 | " | " | 18.0 | 51.4 | 5.0(EA) | 14.2 | " | 95 | A | 2.4 | 99 |

Note:
St: Styrene
MMA: Methyl methacrylate
AE: Acrylic acid ester
EA: Ethyl acrylate
BA: Butyl acrylate
2-EHA: 2-ethylhexyl acrylate
Tp: Parallel light transmittance

EXAMPLES 16, 17 AND 18

Shaped articles were prepared as in Example 1 except that the mixing proportions of the MBAS resin obtained in Example 1 and the MS resin were changed. The physical properties of the shaped articles are shown in Table 3.

TABLE 3

| Example No. | Compounding ratio (part by weight) MS resin/ MBAS resin | Physical properties of T-die sheet | | Physical properties of injection-molded article | |
|---|---|---|---|---|---|
| | | Transparency (Tp %) | State of fish eyes rank | Izod strength (kg · cm/cm) | Vicat softening temperature (°C.) |
| 16 | 95/5 | 93 | A | 1.8 | 104 |
| 17 | 90/10 | 93 | A | 2.5 | 103 |
| 18 | 70/30 | 92 | A | 6.9 | 94 |

What is claimed is:

1. An impact-resistant thermoplastic resin composition having excellent transparency and appearance properties which comprises (A) 1 to 50 parts by weight of a butadiene-styrene-methyl methacrylate-alkyl acrylate graft copolymer obtained by postpolymerization of styrene, methyl methacrylate and an alkyl acrylate to a latex comprising 40 to 80 parts by weight of a butadiene homopolymer rubber or a butadiene-styrene copolymer rubber comprising mainly butadiene and having an average particle diameter of 0.1 to 0.5μ, the amount of the postpolymerization monomers being such as to provide 100 parts by weight total in complementary relationship with the rubber content in the latex, the mutual proportion of the postpolymerization monomers being 20 to 65% by weight of styrene, 20 to 70% by weight of methyl methacrylate and 1 to 35% by weight of alkyl acrylate, the postpolymerization monomers further comprising 0.1 to 5 parts by weight, based on 100 parts by weight of the total amount of the rubber and the postpolymerization monomers, of a cross-linking monomer copolymerizable with the postpolymerization monomers, and (B) 50 to 99 parts by weight of a methyl methacrylate-styrene copolymer having a composition of 40 to 80% by weight of methyl methacrylate and 20 to 60% by weight of styrene, wherein the total amount of the composition is 100 parts by weight.

2. A composition as claimed in claim 1, wherein the alkyl acrylate in the postpolymerization has 2 to 8 carbon atoms in the alkyl.

* * * * *